United States Patent
Nakanishi et al.

(10) Patent No.: US 6,534,576 B2
(45) Date of Patent: Mar. 18, 2003

(54) FLAME RETARDANT ORGANIC RESIN COMPOSITION

(75) Inventors: Koji Nakanishi, Chiba Prefecture (JP); Hidekatsu Hatanaka, Chiba Prefecture (JP); Haruhiko Furukawa, Ichihara (JP); Koji Shiromoto, Chiba Prefecture (JP); Hiroshi Ueki, Chiba Prefecture (JP); Yoshitsugu Morita, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/907,281

(22) Filed: Jul. 17, 2001

(65) Prior Publication Data

US 2002/0077400 A1 Jun. 20, 2002

(51) Int. Cl.$^7$ .............................. C08K 5/04; C08K 5/09
(52) U.S. Cl. .................... 524/297; 524/400; 524/544
(58) Field of Search ................ 524/267, 400, 524/544

(56) References Cited

U.S. PATENT DOCUMENTS

| | | | |
|---|---|---|---|
| 4,197,384 A | 4/1980 | Bialous et al. | 525/464 |
| 4,265,801 A | 5/1981 | Moody et al. | 260/40 |
| 5,100,958 A | 3/1992 | Furh et al. | 525/66 |
| 6,284,824 B1 | 9/2001 | Iji et al. | 524/267 |

FOREIGN PATENT DOCUMENTS

| | | | | |
|---|---|---|---|---|
| CA | 2042223 | 12/1991 | ........... | C08L/83/04 |
| DE | 19850453 | 5/1999 | ........... | C08L/69/00 |
| EP | 0829521 A1 | 3/1998 | ......... | C08L/101/02 |
| EP | 1 035 169 A1 | 11/1998 | ........... | C08L/69/00 |
| EP | 0918073 A2 | 5/1999 | ......... | C08L/101/00 |
| EP | 0918073 A3 | 4/2000 | ......... | C08L/101/00 |
| EP | 1026204 A2 | 8/2000 | ........... | C08L/69/00 |
| EP | 1094093 A2 | 4/2001 | ........... | C08L/69/00 |
| JP | 6128424 A | 5/1994 | ........... | C08L/25/04 |
| JP | 6306265 | 11/1994 | ........... | C08L/69/00 |
| JP | 7033971 A | 2/1995 | ........... | C08L/69/00 |
| JP | 8176427 | 7/1996 | ........... | C08L/69/00 |
| JP | 8176425 A | 9/1996 | ........... | C08G/64/06 |
| JP | 9169914 | 6/1997 | ........... | C08L/95/00 |
| JP | 11140329 A | 5/1999 | ............ | C08K/3/00 |
| JP | 3151789 B2 | 4/2000 | ........... | C08L/69/00 |
| JP | 3048738 | 6/2000 | .............. | C08J/3/12 |

OTHER PUBLICATIONS

"New Flame–Retarding Polycarbonate Resin with Silicone Derivative for Electronics Products" NEC Research and Development, Nippon Electric LTD, Tokyo, JP. vol. 39, No. 2, Apr. 1998 pp. 82–87.

*Primary Examiner*—Kriellion A. Sanders
(74) *Attorney, Agent, or Firm*—Patricia M. Scaduto

(57) ABSTRACT

A flame retardant organic resin composition comprising (A) 100 parts by weight of an aromatic ring-containing organic resin and (B) 0.01–50 parts by weight of a branched organopolysiloxane described by average molecular formula $$(R^1{}_3SiO_{1/2})_a(R^2SiO_{3/2})_b(SiO_{4/2})_c(R^3O_{1/2})_d(HO_{1/2})_e,$$

where each $R^1$ is independently selected from alkyl groups comprising 1 to 12 carbon atoms and alkenyl groups comprising 2 to 12 carbon atoms; each $R^2$ is independently selected from alkyl groups comprising 1 to 12 carbon atoms, alkenyl groups comprising 2 to 12 carbon atoms, and aryl groups comprising 6 to 12 carbon atoms, where the aryl groups of $R^2$ are at least 30 mol % based on total monovalent hydrocarbon in $R^1$ and $R^2$, $R^3$ represents an alkyl group, subscripts a and b are positive numbers, and subscripts c, d, and e are 0 or positive numbers.

19 Claims, No Drawings

US 6,534,576 B2

FLAME RETARDANT ORGANIC RESIN COMPOSITION

FIELD OF THE INVENTION

The present invention relates to a flame retardant organic resin composition.

BACKGROUND OF THE INVENTION

Because organic resins with aromatic rings, which are represented by aromatic polycarbonate resins and polyphenylene ether resins, possess superior mechanical strength, electrical characteristics, etc., they are used as engineering plastics in various fields, including OA equipment, electrical and electronic equipment, automobiles, construction and civil engineering. In many cases, these organic resins have been rendered flame retardant for the purpose of fire prevention. One of the methods employed in the past to render such organic resins flame retardant consisted in admixing compounds containing chlorine atoms and bromine atoms to these organic resins. However, organic resin compositions containing compounds of this type had defects such as generating significant amounts of smoke during combustion and producing gases harmful to the human body or gases corrosive to metals and such. For this reason, a considerable number of flame retardant resin compositions have been proposed that do not produce gases harmful to the human body.

In Japanese Unexamined Patent Application Publication No. Hei 08(1996)-176425, a composition was offered that was produced by compounding a silicone resin containing phenyl groups and epoxy groups, which was obtained by the hydrolysis of a phenyl-containing silane and an epoxy-containing silane, with an aromatic polycarbonate resin. However, due to the presence of the epoxy groups, the composition had various problems, such as decreased heat resistance and discoloration. In Japanese Unexamined Patent Application Publication No. Hei 10(1998)-139964, a polycarbonate composition was described that was produced by compounding a high molecular weight silicone resin with a weight average molecular weight in excess of 10,000, which consisted of difunctional siloxane units (D units) and trifunctional siloxane units (T units), with an aromatic polycarbonate resin. However, because the silicone resin used in that composition was a silicone resin of a high molecular weight, it was not easy to prepare. In addition, the flame retardancy of the resultant flame retardant polycarbonate resin composition was insufficient.

In Japanese Unexamined Patent Application Publication No. Hei 11(1999)-140294, a flame retardant polycarbonate resin composition was described that was produced by compounding a phenyl-containing silicone resin comprising difunctional siloxane units (D units) and trifunctional siloxane units (T units) with an aromatic polycarbonate resin. In addition, in Japanese Unexamined Patent Application Publication No. Hei 11(1999)-222559, a flame retardant aromatic polycarbonate resin composition was described that was produced by compounding a phenyl- and alkoxy-containing silicone resin comprising difunctional siloxane units (D units) and trifunctional siloxane units (T units) with an aromatic polycarbonate resin. The flame retardancy of these aromatic polycarbonate resin compositions, however, were not satisfactory for certain intended uses. In Japanese Unexamined Patent Application Publication No. Hei 11(1999)-140329, a flame retardant composition was described that comprised compounding silica powder and a phenyl- and alkyl-containing silicone resin comprising difunctional siloxane units (D units) and trifunctional siloxane units (T units) and including monofunctional siloxane units (M units) with an aromatic polycarbonate resin. However, that aromatic polycarbonate resin composition had various problems, such as the need to admix silica powder in a complicated manufacturing process.

As a result of in-depth investigations directed to solving the above-described problems, the authors of the present invention discovered that the flame retardant property of an aromatic ring-containing organic resin could be considerably improved if a specific branched organopolysiloxane was compounded therewith, thereby arriving at the present invention. It is an object of the present invention to provide an organic resin composition of superior flame retardancy.

SUMMARY OF THE INVENTION

A flame retardant organic resin composition comprising
(A) 100 parts by weight of an aromatic ring-containing organic resin and
(B) 0.01–50 parts by weight of a branched organopolysiloxane described by average molecular formula

$(R^1{}_3SiO_{1/2})_a(R^2SiO_{3/2})_b(SiO_{4/2})_c(R^3O_{1/2})_d(HO_{1/2})_e,$ where each $R^1$ is independently selected from alkyl groups comprising 1 to 12 carbon atoms and alkenyl groups comprising 2 to 12 carbon atoms; each $R^2$ is independently selected from alkyl groups comprising 1 to 12 carbon atoms, alkenyl groups comprising 2 to 12 carbon atoms, and aryl groups comprising 6 to 12 carbon atoms, where the aryl groups of $R^2$ are at least 30 mol % based on total monovalent hydrocarbon in $R^1$ and $R^2$, $R^3$ represents an alkyl group, subscripts a and b are positive numbers, and subscripts c, d, and e are 0 or positive numbers.

DESCRIPTION OF THE INVENTION

The present invention is a flame retardant organic resin composition comprising
(A) 100 parts by weight of an aromatic ring-containing organic resin and
(B) 0.01–50 parts by weight of a branched organopolysiloxane described by average molecular formula

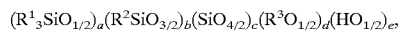

$(R^1{}_3SiO_{1/2})_a(R^2SiO_{3/2})_b(SiO_{4/2})_c(R^3O_{1/2})_d(HO_{1/2})_e,$ where each $R^1$ is independently selected from alkyl groups comprising 1 to 12 carbon atoms and alkenyl groups comprising 2 to 12 carbon atoms; each $R^2$ is independently selected from alkyl groups comprising 1 to 12 carbon atoms, alkenyl groups comprising 2 to 12 carbon atoms, and aryl groups comprising 6 to 12 carbon atoms, where the aryl groups of $R^2$ are at least 30 mol % based on total monovalent hydrocarbon in $R^1$ and $R^2$, $R^3$ represents an alkyl group, subscripts a and b are positive numbers, and subscripts c, d, and e are 0 or positive numbers.

The aromatic ring-containing organic resin of component (A) used in the present invention is exemplified by aromatic polycarbonate resins and polymer alloys thereof, polyphenylene ether resins and polymer alloys thereof, polyarylate resins, polysulfone resins, aromatic polyester resins such as polyethylene terephthalate resin and polybutylene terephthalate resin, aromatic polyamide resins, polyimide resins, polyamideimide resins, polyphenylene sulfide resins, styrene resins such as polystyrene resins, high-impact polystyrene resins, ABS resins, and AS resins, and other thermoplastic resins; Novolac-series epoxy resins, biphenyl-series epoxy resins, and other epoxy resins; phenolic resins, and other thermosetting resins. Preferable among these resins are aromatic polycarbonate resins and polymer alloys thereof.

The branched organopolysiloxane of component (B) used in the present invention is a component that constitutes a characteristic feature of the present invention and fulfills the function of imparting flame retardancy to component (A). Component (B) is represented by the average molecular formula

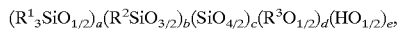

$(R^1{}_3SiO_{1/2})_a(R^2SiO_{3/2})_b(SiO_{4/2})_c(R^3O_{1/2})_d(HO_{1/2})_e$, where each $R^1$ is independently selected from alkyl groups comprising 1 to 12 carbon atoms and alkenyl groups comprising 2 to 12 carbon atoms; each $R^2$ is independently selected from alkyl groups comprising 1 to 12 carbon atoms, alkenyl groups comprising 2 to 12 carbon atoms, and aryl groups comprising 6 to 12 carbon atoms, where the aryl groups of $R^2$ are at least 30 mol % based on total monovalent hydrocarbon in $R^1$ and $R^2$, $R^3$ represents an alkyl group, subscripts a and b are positive numbers, and subscripts c, d, and e are 0 or positive numbers.

In the formula above for $R^1$ and $R^2$, the alkyl groups comprising 1 to 12 carbon atoms are exemplified by methyl, ethyl, n-propyl, isopropyl, butyl, and hexyl, with methyl, ethyl, and isopropyl being the most preferable. The alkenyl groups comprising 2 to 12 carbon atoms are exemplified by vinyl and butenyl. The aryl groups comprising 6 to 12 carbon atoms in $R^2$ are exemplified by phenyl, naphthyl, and tolyl, with phenyl being the most preferable among them. The alkyl groups of $R^3$ are exemplified by methyl, ethyl, propyl, and butyl, and groups represented by the above-mentioned formula $R^3O$, in other words alkoxy groups, are exemplified by methoxy, ethoxy, n-propyloxy, isopropoxy, and butoxy.

In component (B), the content of aryl groups in $R^2$ based on total monovalent hydrocarbon in $R^1$ and $R^2$ must be at least 30 mol %, preferably at least 40 mol %, even more preferably at least 50 mol %, and most preferably at least 60 mol %.

The content of groups represented by the formula $R^3O$, in other words, alkoxy groups, in component (B) can be defined as $d/(a+b+c)$ using subscripts in the average molecular formula of component (B) such that preferably $d/(a+b+c)$ is less than or equal to 0.2 and more preferably less than or equal to 0.1. The content of hydroxyl groups in component (B) is preferably not more than 3 wt %, and, even more preferably, not more than 2 wt %.

The weight average molecular weight of component (B) is generally from 300 to 50,000 and preferably greater than 2000 and less than or equal to 50,000. This is due to the fact that when the weight average molecular weight exceeds 50,000, various problems arise, such as a decrease in the moldability of the present composition. For purposes of the present composition, the weight average molecular weight is typically determined using gel permeation chromatography (GPC).

Component (B) used in the present invention requires trifunctional siloxane units (T units) represented by formula $R^2SiO_{3/2}$ (where $R^2$ is as described above) and monofunctional siloxane units (M units) represented by formula $R^1{}_3SiO_{1/2}$ (where $R^1$ is as described above) in each molecule, but so long as it does not impair the object of the present invention, it may contain tetrafunctional siloxane units (Q units) represented by formula $SiO_{4/2}$ in addition to the trifunctional siloxane units (T units) and monofunctional siloxane units (M units).

The softening point of component (B) used in the present invention is, preferably, not less than 100° C., and even more preferably, not less than 120° C. This is due to the fact that when the softening point of component (B) is less than 100° C., its dispersibility in component (A) decreases, and kneading it with component (A) becomes difficult.

The proportion, in which component (B) is admixed is 0.01–50 parts by weight, preferably 0.1–30 parts by weight, and more preferably, 0.1–10 parts by weight per 100 parts by weight of component (A). This is due to the fact that when this amount is less than 0.01 parts by weight, there are no appreciable effects in terms of enhancing flame retardancy, and there is a decrease in mechanical strength when component (B) exceeds 50 parts by weight.

The present composition comprises the above-described component (A) and component (B); however, in addition to these components, alkali metal salts of organic acids or organic acid esters or alkaline earth metal salts of organic acids or organic acid esters can be compounded therewith, as component (C), in order to further enhance its flame retardancy. The organic acids forming part of component (C) are exemplified by organic sulfonic acids and organic carboxylic acids, while the organic acid esters are exemplified by organic phosphoric acid esters. The alkali metals are exemplified by sodium, potassium, lithium, and cerium, and the alkaline earth metals are exemplified by magnesium, calcium, strontium, and barium. Among them, it is preferable to use metal salts of organic sulfonic acids, with metal salts of perfluoroalkane sulfonic acids and metal salts of aromatic sulfone sulfonic acids being even more preferable. Sodium perfluorobutanesulfonate, potassium perfluorobutanesulfonate, sodium perfluoromethylbutanesulfonate, potassium perfluoromethylbutanesulfonate, sodium perfluorooctanesulfonate, and potassium perfluorooctanesulfonate are suggested as specific examples of the metal salts of perfluoroalkane sulfonic acids. Sodium salt of diphenylsulfone-3-sulfonic acid, potassium salt of diphenylsulfone-3-sulfonic acid, sodium salt of 4,4-dibromodiphenylsulfone-3-sulfonic acid, potassium salt of 4,4-dibromodiphenylsulfone-3-sulfonic acid, calcium salt of 4-chloro-4-nitrodiphenylsulfone-3-sulfonic acid, disodium salt of diphenylsulfone-3,3-disulfonic acid, and dipotassium salt of diphenylsulfone-3,3-disulfonic acid are suggested as specific examples of metal salts of aromatic sulfone sulfonic acids. The quantity of this component (C) is 0.02–1 wt % per 100 parts by weight of component (A).

The composition of the present invention comprises the above-described component (A) and component (B), or component (A), component (B), and component (C); however, in order to further increase its flame retardancy, a fluorocarbon resin powder can be compounded therewith, as component (D). The fluorocarbon resins, from which such fluorocarbon resin powder is obtained, are exemplified by fluoroethylene resins (polymers of monomers in which one or more fluorine atoms are substituted for the hydrogen atoms of ethylene, with tetrafluoroethylene resin as their representative example), chlorotrifluoroethylene resin, tetrafluoroethylene-hexafluoroethylenepropylene resin, fluorinated vinyl resins, vinylidene fluoride resin, and dichlorodifluoroethylene resin. The shape of these fluorocarbon resin powders is normally spherical, but may also be filament-like. Component (D) can be admixed at 0.01–5 parts by weight per 100 parts by weight of component (A).

Various additives known to be useful for aromatic ring-containing organic resins may be compounded with the present composition so long as this does not impair the purpose of the present invention. Such additives are exemplified by glass fiber, glass beads, glass flakes, carbon black, calcium sulfate, calcium carbonate, calcium silicate, titanium oxide, alumina, silica, asbestos, talc, clay, mica, quartz powder, and other inorganic fillers; various synthetic resins, various elastomers, and other organic resin additives; hindered phenolic antioxidants, phosphorous acid ester-type antioxidants, phosphoric acid ester-type antioxidants, amine-type antioxidants, and other antioxidants; aliphatic carboxylic acid esters, paraffin, polyethylene waxes and other lubricants; various organic or inorganic pigments and colorants; benzotriazole-type UV absorbers, benzophenone-type UV absorbers, and other UV absorbers; hindered amine-type light stabilizers and other light stabilizers; phosphorus-based flame retardants and various other flame retardancy-imparting agents; various mold release agents; and various anti-static agents.

The present composition can be easily prepared by uniformly mixing the above-described component (A) and component (B), or component (A) through component (C), or component (A) through component (D). The equipment used for mixing the above components is exemplified by ribbon blenders, Henschel mixers, Banbury mixers, drum tumblers, single screw extruders, double screw extruders, kneaders, multi-screw extruders, and the like. It is preferable to mix the above-mentioned components at a temperature of 200–350° C.

The superior flame retardancy of the present composition as described above makes it suitable for use in various applications where the property is required, such as in electrical household appliances, automobile interiors, housing materials, and in materials used for electrical and electronic components.

Hereinbelow, the present invention is explained by referring to working examples. In the working examples, the word "part" refers to "parts by weight." In addition, in the working examples, flame retardancy was measured using the oxygen index in accordance with JIS K 7201, "Plastics—Determination of burning behavior by oxygen index."

Also, the branched organopolysiloxanes SNR1, SNR2, SNR3, SNR4, SNR5, SNR6, SNR7, SNR8, SNR9, and SNR10 used in the working examples had the average unit formulas and average molecular formulas indicated in Table 1 and the characteristics indicated in Table 2 shown hereinbelow. In addition, in Table 1, Me represents methyl, Pr represents propyl, Ph represents phenyl, M represents a $Me_3SiO_{1/2}$ unit, D represents a $Me_2SiO_{2/2}$ unit, T represents a $MeSiO_{3/2}$ unit, $T^{Pr}$ represents a $C_3H_7SiO_{3/2}$ unit, and $T^{Ph}$ represents a $PhSiO_{3/2}$ unit. The analysis of the molecular structure of the branched organopolysiloxanes was carried out using nuclear magnetic resonance spectra (NMR), and the measurement of their weight average molecular weight was carried out using gel permeation chromatography (GPC). Here, "weight average molecular weight" is a value obtained by conversion to a polystyrene standard of known molecular weight. Also, the softening point of the branched organopolysiloxanes was measured using melting point-measuring equipment by determining the temperature at which the white fine powder softened and became transparent under a microscope.

TABLE 1

| Branched Organo-polysiloxane | Average Unit Formula | Average Molecular Formula |
|---|---|---|
| SNR1 | $Ph(HO)_{0.29}SiO_{1.36}$ | $T^{Ph}(HO^{1/2})_{0.29}$ |
| SNR2 | $Pr_{0.30}Ph_{0.70}(HO)_{0.44}SiO_{1.5}$ | $T^{Pr}_{0.30}T^{Ph}_{0.70}(HO^{1/2})_{0.44}$ |
| SNR3 | $Me(HO)_{0.22}SiO_{1.39}$ | $T_{0.70}(HO^{1/2})_{0.22}$ |
| SNR4 | $Me_{0.18}Ph_{0.91}(HO)_{0.24}SiO_{1.34}$ | $D_{0.09}T^{Ph}_{0.91}(HO^{1/2})_{0.24}$ |
| SNR5 | $Me_{1.18}(HO)_{0.03}SiO_{1.4}$ | $M_{0.069}T_{0.94}(HO^{1/2})_{0.1}$ |
| SNR6 | $Me_{0.27}Ph_{0.91}(HO)_{0.1}SiO_{1.36}$ | $M_{0.09}T^{Ph}_{0.91}(HO^{1/2})_{0.1}$ |
| SNR7 | $Me_{0.15}Pr_{0.29}Ph_{0.66}(HO)_{0.1}SiO_{1.4}$ | $M_{0.05}T^{Pr}_{0.29}T^{Ph}_{0.66}(HO^{1/2})_{0.1}$ |
| SNR8 | $Me_{0.45}Ph_{0.85}(HO)_{0.07}SiO_{1.32}$ | $M_{0.15}T^{Ph}_{0.85}(HO^{1/2})_{0.07}$ |
| SNR9 | $Me_{0.12}Ph_{0.96}(HO)_{0.08}SiO_{1.42}$ | $M_{0.04}T^{Ph}_{0.96}(HO^{1/2})_{0.08}$ |
| SNR10 | $Me_{0.84}Ph_{0.36}(HO)_{0.1}SiO_{1.4}$ | $M_{0.1}T_{0.54}T^{Ph}_{0.36}(HO^{1/2})_{0.1}$ |

TABLE 2

| Branched Organo-polysiloxane | Aryl group Content (mol %) | Hydroxyl Radical Content (wt %) | Softening Point (° C.) | Weight Average Molecular Weight |
|---|---|---|---|---|
| SNR1 | 100 | 3.7 | 180 | 5200 |
| SNR2 | 70 | 6.0 | 80 | 1600 |
| SNR3 | 0 | 5.3 | 50 | 9180 |
| SNR4 | 83 | 3.1 | 130 | 4400 |
| SNR5 | 0 | 2.5 | 80 | 34000 |
| SNR6 | 77 | 1.4 | 220 | 5300 |
| SNR7 | 60 | 1.4 | 150 | 8200 |
| SNR8 | 65 | 0.9 | 210 | 6600 |
| SNR9 | 89 | 1.0 | 190 | 9000 |
| SNR10 | 30 | 1.9 | 120 | 16200 |

REFERENCE EXAMPLE 1

400 g Toluene and 250 g water were placed in a 2-L four-neck flask equipped with a stirrer, a cooling system, a dropping funnel, and a temperature gauge, and a mixed solution composed of 300 g phenyltrichlorosilane and 200 g toluene was added to it in a dropwise manner while cooling the mixture in an ice bath. Upon termination of the dropwise addition, the mixture was stirred at room temperature for 30 minutes and then refluxed for 3 hours. After that, the solution was left to stand and the aqueous layer was removed from it. Subsequently, water was added to the solution, which was stirred and left to stand, and the aqueous layer was removed therefrom. After repeating the washing process three times, a 4% aqueous solution of sodium bicarbonate was added to the resultant toluene phase, and the mixture was refluxed for 1 hour, cooled, and then washed with water three times, to give a toluene solution of a branched organopolysiloxane. Insoluble matter was removed by filtering the toluene solution, and 177.7 g of a solid branched organopolysiloxane (SNR1) was obtained by removing toluene by means of distillation under reduced pressure. The branched organopolysiloxane (SNR1) consisted of $PhSiO_{3/2}$ units and contained 3.7 wt % of hydroxyl groups. Its weight average molecular weight was 5,200.

REFERENCE EXAMPLE 2

400 g Toluene and 250 g water were placed in a 2-L four-neck flask equipped with a stirrer, a cooling system, a dropping funnel, and a temperature gauge, and a mixed solution composed of 147 g phenyltrichlorosilane, 200 g isopropyltrichlorosilane, and 200 g toluene was added to it in a dropwise manner while cooling the mixture in an ice bath. Upon termination of the dropwise addition, the mixture was stirred at room temperature for 30 minutes and then refluxed for 3 hours. After that, the solution was left to stand and the aqueous layer was removed from it. Subsequently, water was added to the solution, the solution was stirred and left to stand, and the aqueous layer was removed therefrom. After repeating the washing process three times, a 4% aqueous solution of sodium bicarbonate was added to the resultant toluene phase, and the mixture was refluxed for 1 hour, cooled, and then washed with water three times, to give a toluene solution of a branched organopolysiloxane. Insoluble matter was removed by filtering the toluene solution, and 115.2 g of a solid branched organopolysiloxane (SNR2) was obtained by removing toluene by means of distillation under reduced pressure. The branched organopolysiloxane (SNR2) consisted of 70 mol % of $PhSiO_{3/2}$ units 30 mol % of $C_3H_7SiO_{3/2}$ units and contained 6 wt % hydroxyl groups. Its weight average molecular weight was 1,600.

REFERENCE EXAMPLE 3

400 g Water and 300 g methylisobutylketone were placed in a 2-L four-neck flask, which was equipped with a stirrer, a cooling system, a dropping funnel, and a temperature gauge, and subjected to vigorous agitation so as to prevent the mixture from separating into two layers. 149 g Methyltrichlorosilane dissolved in 100 g methylisobutylketone was slowly added to the reaction mixture in a dropwise manner while making sure its temperature did not exceed 50° C. After that, the reaction mixture was stirred under heating at 50° C. for 2 hours. Upon termination of the reaction, the organic phase was washed until the wash rinse became neutral, whereupon the organic phase was dried using a desiccating agent. After removing the desiccating agent, low-boiling components were eluted under reduced pressure and vacuum drying was conducted for 8 hours to give 56.9 g of a branched organopolysiloxane (SNR3). The branched organopolysiloxane (SNR3) consisted of $MeSiO_{3/2}$ units and contained 5.3 wt % of hydroxyl groups. Its weight average molecular weight was 9,180.

REFERENCE EXAMPLE 4

108 g Toluene, 36 g methyl ethyl ketone, and 29 g water were placed in a 1-L four-neck flask equipped with a stirrer, a cooling system, a dropping funnel, and a temperature gauge, and a mixed solution composed of 114.8 g phenyltrichlorosilane, 7.8 g dimethyldichlorosilane, and 38 g toluene was added to it in a dropwise manner while cooling the mixture in an ice bath. Upon termination of the dropwise addition, the mixture was stirred at room temperature for 30 minutes and then refluxed for 1 hour, causing hydrolysis to proceed to completion. After cooling, 30 ml toluene were added to the solution, the solution was left to stand, and the aqueous layer was removed from it. Subsequently, the solution was washed three times with water. Then, a 4% aqueous solution of sodium bicarbonate was added to the toluene phase, and the mixture was refluxed for 1 hour, cooled, and then washed with water three times, whereupon a desiccating agent was added to the solution and the solution was left to stand. 69 g Of a solid branched organopolysiloxane (SNR4) was produced by eluting low-boiling components under reduced pressure from the toluene solution after filtering off the desiccating agent. The branched organopolysiloxane (SNR4) consisted of 90 mol % of $PhSiO_{3/2}$ units and 10 mol % of $Me_2SiO_{2/2}$ units and contained 3.1 wt % of hydroxyl groups. Its weight average molecular weight was 4,400.

REFERENCE EXAMPLE 5

25.5 g Of the branched organopolysiloxane obtained in Reference Example 3 and 50 g of dry toluene solution were placed in a 300-mL four-neck flask equipped with a stirrer, a cooling system, and a temperature gauge, and then, after adding 10 g hexamethyldisilazane, the mixture was stirred at room temperature for 3 hours. After that, the mixture was subjected to further agitation at 70° C. for 1 hour. Low-boiling components were distilled off under reduced pressure, producing 25.8 g of a colorless solid branched organopolysiloxane (SNR5). The branched organopolysiloxane (SNR5) consisted of 91 mol % of $MeSiO_{3/2}$ units and 9 mol % of $Me_3SiO_{1/2}$ units and contained 2.5 wt % of hydroxyl groups. Its weight average molecular weight was 34,000.

REFERENCE EXAMPLE 6

29 g Of the branched organopolysiloxane obtained in Reference Example 1 and 110 g of dry toluene solution were placed in a 300-mL four-neck flask equipped with a stirrer, a cooling system, and a temperature gauge, and then, after adding 5 g hexamethyldisilazane, the mixture was stirred at room temperature for 3 hours. After that, the mixture was subjected to further agitation at 70° C. for 1 hour. Low-boiling components were distilled off under reduced pressure, producing 29.7 g of a colorless solid branched organopolysiloxane (SNR6). The branched organopolysiloxane (SNR6) consisted of 92 mol % of $PhSiO_{3/2}$ units and 8 mol % of $Me_3SiO_{1/2}$ units and contained 1.4 wt % of hydroxyl groups. Its weight average molecular weight was 5,300.

REFERENCE EXAMPLE 7

35 g Of the branched organopolysiloxane obtained in Reference Example 2 and 130 g of dry toluene solution were placed in a 300-mL four-neck flask equipped with a stirrer, a cooling system, and a temperature gauge, and then, after adding 6 g hexamethyldisilazane, the mixture was stirred at room temperature for 3 hours. After that, the mixture was subjected to further mixing at 70° C. for 1 hour. Low-boiling components were distilled off under reduced pressure, producing 35.7 g of a colorless solid branched organopolysiloxane (SNR7). The branched organopolysiloxane (SNR7) consisted of 65.8 mol % of $PhSiO_{3/2}$ units, 28.2 mol % of $C_3H_7SiO_{3/2}$ units, and 6 mol % of $Me_3SiO_{1/2}$ units and its weight average molecular weight was 8,200.

REFERENCE EXAMPLE 8

21.5 g Of the branched organopolysiloxane obtained in Reference Example 1 (SNR1) and 70 g of dry toluene solution were placed in a 300-mL four-neck flask equipped with a stirrer, a cooling system, and a temperature gauge, and then, after adding 4.4 g diethylamine and 4.8 g trimethylchlorosilane, the mixture was stirred for 1 hour with cooling by ice. After that, the mixture was subjected to further mixing at room temperature for 2 hours and then at 70° C. for 1 hour. Upon termination of the reaction, the reaction solution was brought back to room temperature and washed by adding water until it became neutral, whereupon anhydrous magnesium oxide was added to the organic phase to dry it. The desiccating agent was removed by filtration, and low-boiling components were distilled off under reduced pressure, producing 22.4 g of a colorless solid branched organopolysiloxane (SNR8). The branched organopolysiloxane (SNR8) consisted of 85 mol % of $PhSiO_{3/2}$ units and 15 mol % of $Me_3SiO_{1/2}$ units and contained 0.9 wt % of hydroxyl groups. Its weight average molecular weight was 6,600.

REFERENCE EXAMPLE 9

21.5 g Of the branched organopolysiloxane obtained in Reference Example 1 (SNR1) and 43 g of dry toluene solution were placed in a 300-mL four-neck flask equipped with a stirrer, a cooling system, and a temperature gauge. After adding 4.2 g triethylamine and 4.8 g trimethylchlorosilane at room temperature, the mixture was stirred for 3 hours. After that, the mixture was subjected to further mixing at 70° C. for 1 hour. Upon termination of the reaction, the reaction solution was brought back to room temperature and washed by adding water until it became neutral, whereupon anhydrous magnesium oxide was added to the organic phase to dry it. The desiccating agent was removed by filtration, producing 22.4 g of a colorless solid branched organopolysiloxane (SNR9). The branched organopolysiloxane (SNR9) consisted of 96 mol % of $PhSiO_{3/2}$ units and 4 mol % of $Me_3SiO_{1/2}$ units and contained 1 wt % of hydroxyl groups. Its weight average molecular weight was 9,000.

REFERENCE EXAMPLE 10

5.16 g Of the branched organopolysiloxane obtained in Reference Example 1 (SNR1), 4.02 g of the branched organopolysiloxane obtained in Reference Example 3 (SNR3), 1.6 g hexamethyldisiloxane, and 40 g toluene were placed in a 100-mL four-neck flask equipped with a stirrer, a cooling system, an ester adapter, and a temperature gauge. After adding 0.4 g activated clay, the mixture was subjected to a dehydration reaction by refluxing it for 6 hours under heating. Upon termination of the reaction, the activated clay was filtered off, and the toluene solution was washed with water three times. After drying the toluene phase by adding a desiccating agent, the desiccating agent was filtered off. 9.3 g Of a branched organopolysiloxane (SNR10) was obtained by removing toluene from this toluene solution by means of distillation under reduced pressure. The branched organopolysiloxane consisted of 36 mol % of $PhSiO_{3/2}$ units, 54 mol % of $MeSiO_{3/2}$ units, and 10 mol % of $Me_3SiO_{1/2}$ units, and its weight average molecular weight was 16,200.

WORKING EXAMPLES 1 THROUGH 9, COMPARATIVE EXAMPLES 1 THROUGH 6

Flame retardant polycarbonate resin compositions were obtained by mixing an aromatic polycarbonate resin (produced by Idemitsu Petrochemical Co., Ltd., trade name: TAFURON A1900), as the aromatic ring-containing organic resin, and siloxanes SNR1 through SNR10 listed in Table 1 above, as the branched organopolysiloxane, in the compounding proportions listed in Tables 3–6, which are shown below. Also, a fluorocarbon resin powder (a perfluoroethylene resin from Daikin Industries, Ltd., trade name: POLYFLON™ MPA, FA-500) and sodium trichlorobenzenesulfonate (produced by Dainippon Ink & Chemicals, Inc., trade name: MEGAFUAKKU F114) were used as the third component. The method used for mixing the ingredients was as follows. The aromatic polycarbonate resin was charged to a mixing apparatus (the "Labo Plastomill," manufactured by Toyo Seiki Seisaku-Sho, Ltd.), and melted by heating to 280–320° C. Subsequently, the branched organopolysiloxanes (SNR1 through SNR10) were charged to the apparatus and kneaded with the resin, to give flame retardant polycarbonate resin compositions. The compositions were injection molded at a molding temperature of 280 –320° C. The oxygen index of the moldings was measured, and the results of the measurement are listed in Tables 3–6, which are shown hereinbelow.

TABLE 3

|  | Working Example 1 | Working Example 2 | Working Example 3 | Working Example 4 |
|---|---|---|---|---|
| Composition |  |  |  |  |
| Polycarbonate resin | 100 parts | 100 parts | 100 parts | 100 parts |
| Branched organopolysiloxane |  |  |  |  |
| SNR6 | 2 | 5 | 8 |  |
| SNR7 |  |  |  | 5 |
| Characteristics |  |  |  |  |
| Oxygen index | 32 | 39 | 41 | 35 |

TABLE 4

|  | Working Example 5 | Working Example 6 | Working Example 7 |
|---|---|---|---|
| Composition |  |  |  |
| Polycarbonate resin | 100 parts | 100 parts | 100 parts |
| Branched organopolysiloxane |  |  |  |
| SNR8 | 5 |  |  |
| SNR9 |  | 5 |  |
| SNR10 |  |  | 5 |
| Characteristics |  |  |  |
| Oxygen index | 37 | 38 | 30 |

TABLE 5

|  | Working Example 8 | Working Example 9 |
|---|---|---|
| Composition |  |  |
| Polycarbonate resin | 100 parts | 100 parts |
| Branched organopolysiloxane |  |  |
| SNR6 | 5 | 5 |
| Fluorocarbon resin powder | 0.5 |  |
| Sodium trichlorobenzenesulfonate |  | 0.5 |
| Characteristics |  |  |
| Oxygen index | 40 | 40 |

TABLE 6

| | Comp. Example 1 | Comp. Example 2 | Comp. Example 3 | Comp. Example 4 | Comp. Example 5 | Comp. Example 6 |
|---|---|---|---|---|---|---|
| Composition | | | | | | |
| Polycarbonate resin | 100 parts | 100 parts | 100 parts | 100 parts | 100 parts | 100 parts |
| Branched organopolysiloxane | | | | | | |
| SNR1 | | 5 | | | | |
| SNR2 | | | 5 | | | |
| SNR3 | | | | 5 | | |
| SNR4 | | | | | 5 | |
| SNR5 | | | | | | 5 |
| Characteristics | | | | | | |
| Oxygen index | 26 | 27 | 29 | 26 | 26 | 26 |

We claim:

1. A flame retardant organic resin composition comprising
   (A) 100 parts by weight of an aromatic ring-containing organic resin and
   (B) 0.01–50 parts by weight of a branched organopolysiloxane described by average molecular formula

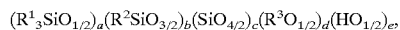

$(R^1{}_3SiO_{1/2})_a(R^2SiO_{3/2})_b(SiO_{4/2})_c(R^3O_{1/2})_d(HO_{1/2})_e$, where each $R^1$ is independently selected from alkyl groups comprising 1 to 12 carbon atoms and alkenyl groups comprising 2 to 12 carbon atoms; each $R^2$ is independently selected from alkyl groups comprising 1 to 12 carbon atoms, alkenyl groups comprising 2 to 12 carbon atoms, and aryl groups comprising 6 to 12 carbon atoms, where the aryl groups of $R^2$ are at least 30 mol % based on total monovalent hydrocarbon in $R^1$ and $R^2$, $R^3$ represents an alkyl group, subscripts a and b are positive numbers, and subscripts c, d, and e are 0 or positive numbers.

2. The flame retardant organic resin composition according to claim 1, where component (A) is a thermoplastic resin.

3. The flame retardant organic resin composition according to claim 1, where component (A) is an aromatic polycarbonate resin or a polymer alloy thereof.

4. The flame retardant organic resin composition according to claim 1, where the content of $R^1$ is 0.02–50 mol % based on total monovalent hydrocarbon in $R^1$ and $R^2$ in component (B).

5. The flame retardant organic resin composition according to claim 1, where component (B) has a softening point of at least 100° C.

6. The flame retardant organic resin composition according to claim 1, where d/(a+b+c) is less than or equal to 0.2 in component (B).

7. The flame retardant organic resin composition according to claim 1, where component (B) has a content of hydroxyl groups less than or equal to 3 wt %.

8. The flame retardant organic resin composition according to claim 1, where $R^1$ are monovalent hydrocarbon groups selected from the group consisting of methyl, ethyl, propyl, vinyl.

9. The flame retardant organic resin composition according to claim 1, where $R^2$ are monovalent hydrocarbon groups selected from the group consisting of methyl, ethyl, propyl, vinyl, and phenyl.

10. The flame retardant organic resin composition according to claim 1, where the aryl groups of $R^2$ are at least 40 mol % based on total monovalent hydrocarbon in $R^1$ and $R^2$ in component (B).

11. The flame retardant organic resin composition according to claim 1, where the aryl groups of $R^2$ are at least 50 mol % based on total monovalent hydrocarbon in $R^1$ and $R^2$ in component (B).

12. The flame retardant organic resin composition according to claim 1, where the aryl groups of $R^2$ are at least 60 mol % based on total monovalent hydrocarbon in $R^1$ and $R^2$ in component (B).

13. The flame retardant organic resin composition according to claim 1, where component (B) has a weight average molecular weight of greater than 2000 and less than or equal to 50,000.

14. The flame retardant organic resin composition according to claim 1 further comprising as component (C), 0.02–1 part by weight of an alkali metal salt of an organic acid or an organic acid ester, or an alkaline earth metal salt of an organic acid or an organic acid ester.

15. The flame retardant organic resin composition according to claim 1 further comprising as component (D), 0.01–5 parts by weight of a fluorocarbon resin powder.

16. The flame retardant organic resin composition according to claim 1 comprising 0.1–30 parts by weight of component (B) per 100 parts by weight of component (A).

17. The flame retardant organic resin composition according to claim 1 comprising 0.1–10 parts by weight of component (B) per 100 parts by weight of component (A).

18. The flame retardant organic resin composition according to claim 1, where component (B) has a softening point of at least 120° C.

19. The flame retardant organic resin composition according to claim 1, where d/(a+b+c) is less than or equal to 0.1 in component (B).

* * * * *